United States Patent [19]

Kaneko

[11] Patent Number: 4,477,842

[45] Date of Patent: Oct. 16, 1984

[54] DATA REPRODUCING CIRCUIT

[75] Inventor: Kenji Kaneko, Iwai, Japan

[73] Assignee: Victor Company of Japan, Ltd., Kanagawa, Japan

[21] Appl. No.: 368,247

[22] Filed: Apr. 15, 1982

[30] Foreign Application Priority Data

Apr. 20, 1981 [JP] Japan .................................. 56-59437
Apr. 30, 1981 [JP] Japan .................................. 56-65810

[51] Int. Cl.³ ............................................ H04N 5/76
[52] U.S. Cl. .................................. 358/336; 358/342; 360/38.1; 369/32; 369/59
[58] Field of Search ....................... 369/32, 33, 41, 59, 369/54, 58; 365/234, 215; 360/38.1; 358/336, 342, 314, 907

[56] References Cited

U.S. PATENT DOCUMENTS 4,409,627 10/1983 Eto et al. ........................... 360/38.1

OTHER PUBLICATIONS

Malhieu, "A Random Access System Adapted for the Optical Video Disk", Journal of the SMPTE, vol. 86, 2/77, pp. 80–83.

Primary Examiner—Raymond F. Cardillo, Jr.
Attorney, Agent, or Firm—Ladas & Parry

[57] ABSTRACT

A data reproducing circuit comprises a modulated data signal supplying circuit for supplying a modulated data signal including a framing code representing a series of data signals, a clock signal detecting and reproducing circuit supplied with the demodulated data signal, for detecting and reproducing a clock signal, a data signal demodulating circuit supplied with the modulated data signal, for demodulating the data signal, a memory circuit for reading in and reading out a data signal demodulated by the data signal demodulating circuit, a framing code detecting circuit for detecting a framing code within a signal read in by the memory circuit, an instruction signal producing circuit responsive to the detection of the framing code by the framing code detecting circuit, for producing a signal for instructing read-out from the memory circuit, and a dropout detecting circuit for detecting dropout within the modulated data signal supplied thereto and producing a detected output, so that the instruction signal producing circuit does not produce the instruction signal.

7 Claims, 9 Drawing Figures

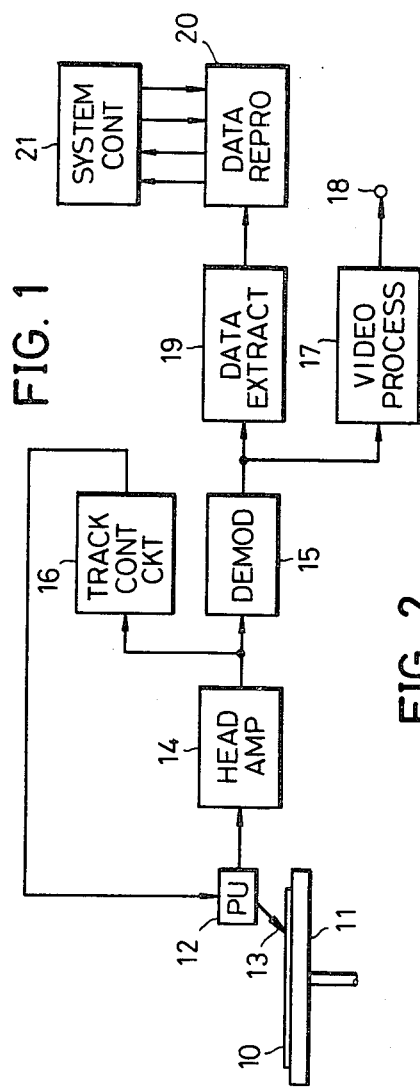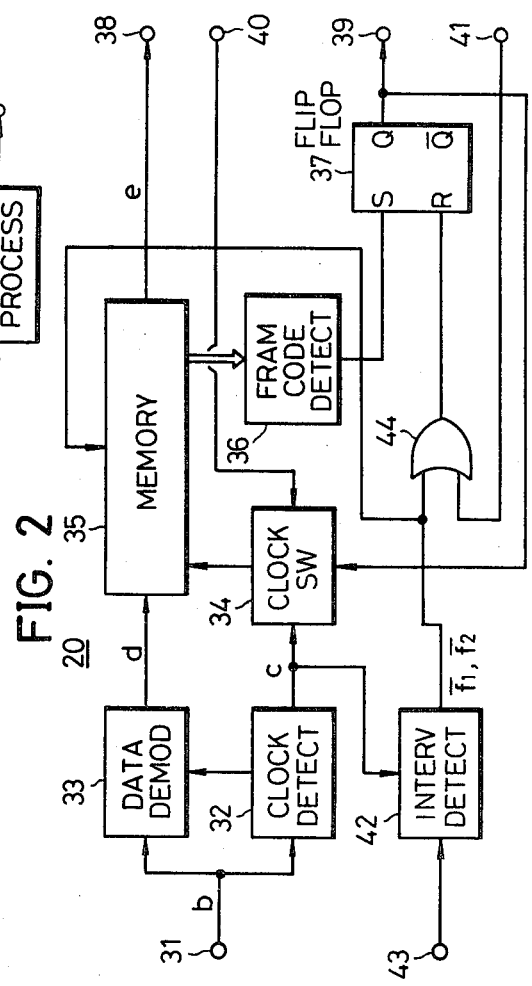

DATA REPRODUCING CIRCUIT

BACKGROUND OF THE INVENTION

The present invention generally relates to data reproducing circuits, and more particularly to a data reproducing circuit which nullifies a series of data when dropout is detected in a data signal picked up from a recording medium, and supplies only a correct data having no dropout to an external circuit.

Recently, apparatus have been realized which are capable of reproducing a recorded information signal from a rotary recording medium (hereinafter simply referred to as a disc). The disc is recorded with a main information signal such as a video signal and an audio signal, on a spiral track formed on the disc. The reproducing apparatus scans over the disc with a reproducing stylus having an electrode, for example, and reproduces the recorded main information signal as variations in electrostatic capacitance between the electrode of the reproducing stylus and the disc. In the above type of a disc, for example, four fields of video signal is recorded for one track turn of the disc. A chapter data indicating a program number of the main information signal, is recorded at the seventeenth H (H indicates a horizontal scanning period) from a rise of a vertical synchronizing signal, within a vertical blanking period in each field. Furthermore, a time data indicating a recorded position (address) of the main information signal from the position where the recording was started in reproducing time, is recorded on the disc at the eighteenth H. For example, these data are data signals using the biphase space code.

In the above type of a disc, when dropout exists in the data signal picked up from the disc by the reproducing stylus, this data signal is reproduced as a signal having an erroneous data content. Accordingly, when the signal having the erroneous data content due to dropout and the like is used, there is a disadvantage in that erroneous chapter data and erroneous time data are obtained.

On the other hand, the video signal of four fields is recorded in one track turn of the disc as described above. Hence, there are four vertical blanking periods in one track turn of the disc. This means that signals having the same data content are recorded at four positions for one track turn of the disc. Therefore, when data reproduction is erroneously performed due to the above dropout and the like, no hindrance will be introduced even if the erroneous data is not used and the data at other vertical blanking period positions within the same track turn is used instead.

SUMMARY OF THE INVENTION

Accordingly, it is a general object of the present invention to provide a novel and useful data reproducing circuit in which the above described disadvantages have been overcome.

Another and more specific object of the present invention is to provide a reproducing circuit which detects dropout when the dropout is introduced in a data signal picked up from a recording medium, and nullifies the data signal in which the dropout exists.

Still another object of the present invention is to provide a data reproducing circuit which nullifies the data signal so that the data signal is not supplied to an external circuit when the above dropout is detected.

Another object of the present invention is to provide a data reproducing circuit in which a memory is reset when the above dropout is detected in order to clear the content of the memory.

Still another object of the present invention is to provide a data reproducing circuit which cancels all the data within one predetermined interval, when the above dropout is introduced within that one predetermined interval such as one horizontal scanning period represented and sectioned by a framing code.

Other objects and further features of the present invention will be apparent from the following detailed description when read in conjunction with the accompanying drawings.

BRIEF DESCRIPTION OF THE DRAWINGS

FIG. 1 is a systematic block diagram showing an example of a rotary recording medium reproducing apparatus applied with a data reproducing circuit according to the present invention;

FIG. 2 is a systematic block diagram showing a first embodiment of a data reproducing circuit according to the present invention;

DETAILED DESCRIPTION

Figure 3A:
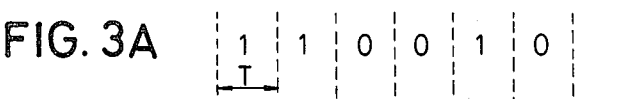
FIGS. 3A through 3F respectively show waveforms at each part of the block system shown in FIG. 2.

In FIG. 1, a rotary recording medium (hereinafter simply referred to as a disc) 10 on which a video signal is recorded, is rotated at a predetermined rotational speed by a turntable 11. A reproducing stylus 13 of a signal pickup device 12 makes contact with the recording surface of the disc 10, to pick up and reproduce the recorded signal from the disc 10. In the present embodiment of the invention, the video signal is recorded on the disc 10 as variations in geometrical configuration, and the recorded video signal is reproduced from the disc 10 as variations in electrostatic capacitance between the disc 10 and an electrode of the reproducing stylus 13. Reference signals for tracking control are recorded on the disc 10 besides the video signal, and these reference signals are reproduced together with the video signal.

The signal picked up and reproduced from the disc 10, is supplied to a demodulator 15 and a tracking control circuit 16, through a head amplifier 14. The reference signals for tracking control are separated at the tracking control circuit 16, and a tracking control signal formed from these reference signals. The tracking control signal thus formed by the tracking control circuit 16 is supplied to a tracking coil within the signal pickup device 12. Accordingly, tracking control is performed so that the reproducing stylus 13 accurately scans over video signal tracks formed on the disc 10.

On the other hand, the picked up video signal is demodulated at the demodulator 15, and then supplied to a video signal processing circuit 17 wherein a predetermined signal processing is performed. Hence, the demodulated video signal thus subjected to the predetermined signal processing, is supplied to a picture tube of a receiver (not shown) through a terminal 18, and reproduced as a reproduced picture. The signal obtained from the demodulator 15 is supplied to a data extracting circuit 19 wherein a data is extracted. The extracted data signal is supplied to a data reproducing circuit 20.

Figure 3B:
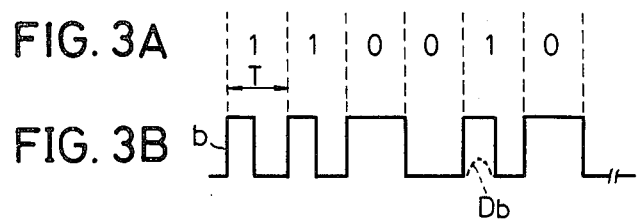

As described above, the above data signal comprises a chapter data existing at one horizontal scanning period at the seventeenth H from the rise of the vertical synchronizing signal within the vertical blanking period and/or a time data existing at one horizontal scanning period at the eighteenth H. This data signal comprises a bi-phase space code data signal as indicated in FIGS. 3A and 3B. As indicated in FIG. 3A, this signal indicates a low level (L-level) and a high level (H-level) with a duty cycle of 50% within a bit interval T when the data is "1". When the data is "0", the above signal indicates an L-level or a H-level throughout the entire bit interval T. Hence, the above signal has a waveform b wherein the L-level and H-level periods alternately exist.

Figure 3C:
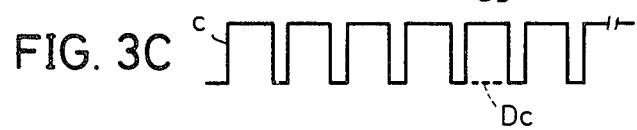

A first embodiment of the data reproducing circuit 20 is shown in FIG. 2. The data signal b extracted at the data extracting circuit 19 shown in FIG. 1, is supplied to a clock detecting (reproducing) circuit 32 and a data demodulating circuit 33 from an input terminal 31. The clock detecting circuit 32 detects and reproduces a clock signal c which is synchronized with the interval T as shown in FIG. 3C. This clock signal c is supplied to the data demodulating circuit 33, a clock switching circuit 34, and a pulse interval detecting circuit 42 for detecting the pulse interval of the clock signal.

Figure 3D:
Figure 3E:
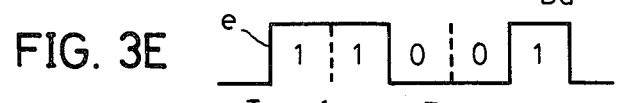

The data demodulating circuit 33 is supplied with the clock signal c and demodulates the modulated data signal b which is obtained from the terminal 31. The data demodulating circuit 33 thus produces a demodulated data signal d and supplies this demodulated signal d to a memory 35. The memory 35 comprises a shift register. The clock switching circuit 34 is normally in a switched state for passing the clock signal c obtained from the clock detecting circuit 32. The memory 35 stores the data signal d as an NRZ signal e indicated in FIG. 3E, with the clock timing of the clock signal c obtained through the clock switching circuit 34.

The data series indicated in FIG. 3A describes a section of a data block in 1H interval, and for example, a framing code such as "1100" is included at the beginning of the 1H interval. When there is no dropout in the picked up data signal and the clock detecting circuit 32 and the data demodulating circuit 33 are operating normally, a framing code is detected by a framing code detecting circuit 36 as the memory 35 normally reads in a data signal of one data block. The detected framing code is supplied to a set terminal of a flip-flop 37 to set this flip-flop 37.

An output obtained from a Q-output terminal of the set flip-flop 37, is supplied to a system controller 21 comprising the micro-computer shown in FIG. 1 as a ready signal, through a terminal 39. This ready signal indicates to the system controller 21 that the data signal is correctly demodulated and reproduced without dropout and stored within the memory 35. Moreover, the ready signal obtained from the Q-output of the flip-flop 37 is also supplied to the clock switching circuit 34. Accordingly, the clock switching circuit 34 becomes connected through the side of a terminal 40. The system controller 21 produces a clock pulse for read-out from the above ready signal, and applies this clock pulse to the terminal 40. The clock pulse for read-out supplied to the system controller 21 through the terminal 40, is supplied to the memory 35 through a clock switching circuit 34. The data signal e read out from the memory 35 by the clock pulse for read-out, is supplied to the system controller 21 through a terminal 38.

When the system controller 21 completes reading out the data from the memory 35, the system controller 21 applies a reset signal to a terminal 41. The reset signal obtained from the terminal 41, is applied to a reset terminal of the flip-flop 37 through an OR-gate 44. Accordingly, the flip-flop 37 is reset, and becomes ready for the next operation.

When a dropout Db exists in the data signal b obtained from the terminal 31 as indicated by a dotted line in FIG. 3B, a dropout is introduced in the clock signal c obtained from the clock detecting circuit 32 as indicated by a dotted line Dc in FIG. 3C. Furthermore, a dropout is introduced in the data signal d obtained from the data demodulating circuit 33 as indicated by a dotted line Dd in FIG. 3D. In this case, although the reproducing stylus 13 picks up the recorded signal by scanning one horizontal scanning period on the disc 10 wherein one data block exists, not all the bits (twenty-nine bits, for example) for one data block are used in the memory 35. Accordingly, the framing code is not detected at the framing code detecting circuit 36 in this case, and the ready signal is not obtained from the flip-flop 37. However, the reproducing stylus 13 scans and reproduces the succeeding one field on the disc 10, to start reproducing the data block within the succeeding vertical blanking period. As the first part of the data signal is read into the memory 35, all the bits for one data block are used in the memory 35, and the framing code is detected at the framing code detecting circuit 36. Then, the ready signal is obtained from the flip-flop 37. When the memroy 35 starts to perform a read-in operation as in the above described case, the data signal in the memory 35 is of an erroneous content comprising a combination of the old data and a part of the new data. Hence, it is undesirable for such an erroneous data content to be supplied to the system controller 21.

Figure 3F:
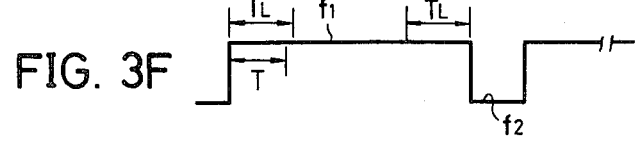

In the data reproducing circuit 20 according to the present invention, measures are taken so that the above described problems are not introduced, by using the following construction. An interval TL which is slightly larger than the data interval (clock interval) T of the clock signal obtained from the clock detecting circuit, is set at the pulse interval detecting circuit 42. The pulse interval detecting circuit 42 is triggered by a rise in the clock signal c. When the clock signal c of the interval T indicated at the left hand side in FIG. 3C is normally supplied to the pulse interval detecting circuit 42, the pulse interval detecting circuit 42 is continuously triggered by the rise in the succeeding clock signal c since the succeeding clock signal c is obtained within the interval TL. Thus, the pulse interval detecting circuit 42 continues to be of high level as indicated by f1 in FIG. 3F. However, when the dropout Db exists in the data signal b and the dropout Dc is accordingly introduced in the clock signal c, the succeeding clock signal is not obtained even after the interval T has lapsed from the rise in the clock signal which is prior to the dropout Dc. Accordingly, the pulse interval detecting circuit 42 becomes of low level as indicated by f2 in FIG. 3F. This means that the pulse interval detecting circuit 42 has detected the dropout.

The pulse interval detecting circuit 42 produces outputs f1 and f2 which are obtained by inverting the above levels f1 and f2. These outputs f1 and f2 are supplied to a reset terminal of the flip-flop 37 through the OR-gate 44. The flip-flop 37 is not reset by the low lever f1, but is reset by the high level f2. Hence, even when an erroneous data content is obtained due to the dropout or the framing code is erroneously detected, the ready signal is not obtained from the flip-flop 37. Thus, an erroneous reproduced data is prevented from being read into the system controller 21. In addition, the outputs f1 and f2 of the pulse interval detecting circuit 42 are also applied to the memory 35, and the memory 35 is reset by the dropout detected output f2. Therefore, when the data block of the succeeding one field is reproduced, this data is successively and correctly read into the memory 35 which is in a cleared state.

Figure 4:
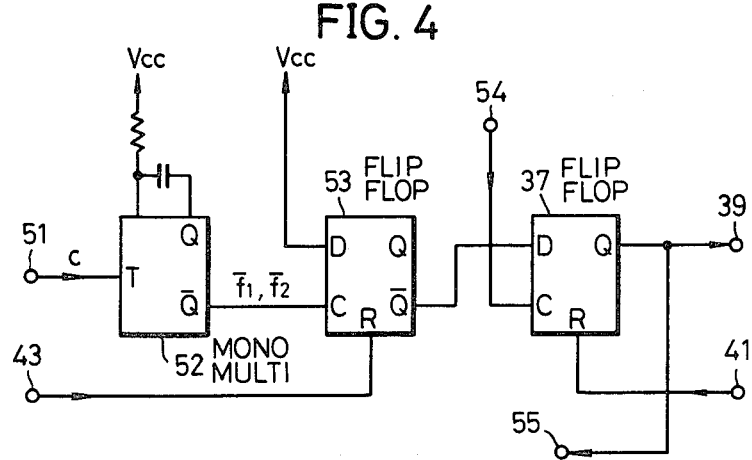
FIG. 4 is a circuit diagram showing an embodiment of a concrete circuit constituting an essential part of the block system shown in FIG. 2.

An embodiment of a concrete circuit corresponding to a circuit part comprising the pulse interval detecting circuit 42, the OR-gate 44, and the flip-flop 37 in the block system shown in FIG. 2, is shown in FIG. 4. The clock signal c from the clock detecting circuit 32 is applied to a terminal 51, and then supplied to a trigger terminal of a re-triggerable monostable multivibrator 52. The output signals f1 and f2 are obtained from a $\bar{Q}$-output terminal of the monostable multivibrator 52, and supplied to a clock terminal of a delay type (D-type) flip-flop 53. The interval during which the output is maintained by one triggering of the monostable multivibrator 52, is set to TL. The flip-flop 53 is set by the output f2 of the monostable multivibrator 52. A $\bar{Q}$-output of the flip-flop 53 is applied to a data terminal of the D-type flip-flop 37. The detected output signal from the framing code detecting circuit 36 is applied to a clock terminal of the flip-flop 37 through a terminal 54. The Q-output of the flip-flop 37 is supplied to the system controller 21 through the terminal 39, as the ready signal.

When dropout exists in the reproduced data, the Q-output of the flip-flop 53 is set by the output f2 of the monostable multivibrator 52. Hence, even when the detected output signal is supplied to the flip-flop 37 through the terminal 54 after the flip-flop 53 is set, the Q-output of the flip-flop 37 is not obtained, and the ready signal is not supplied to the system controller 21. The flip-flop 53 is reset by the horizontal synchronizing signal obtained through a terminal 43. The Q-output of the flip-flop 37 is supplied to the clock switching circuit 34 through a terminal 55, as a clock switching signal.

Figure 5:
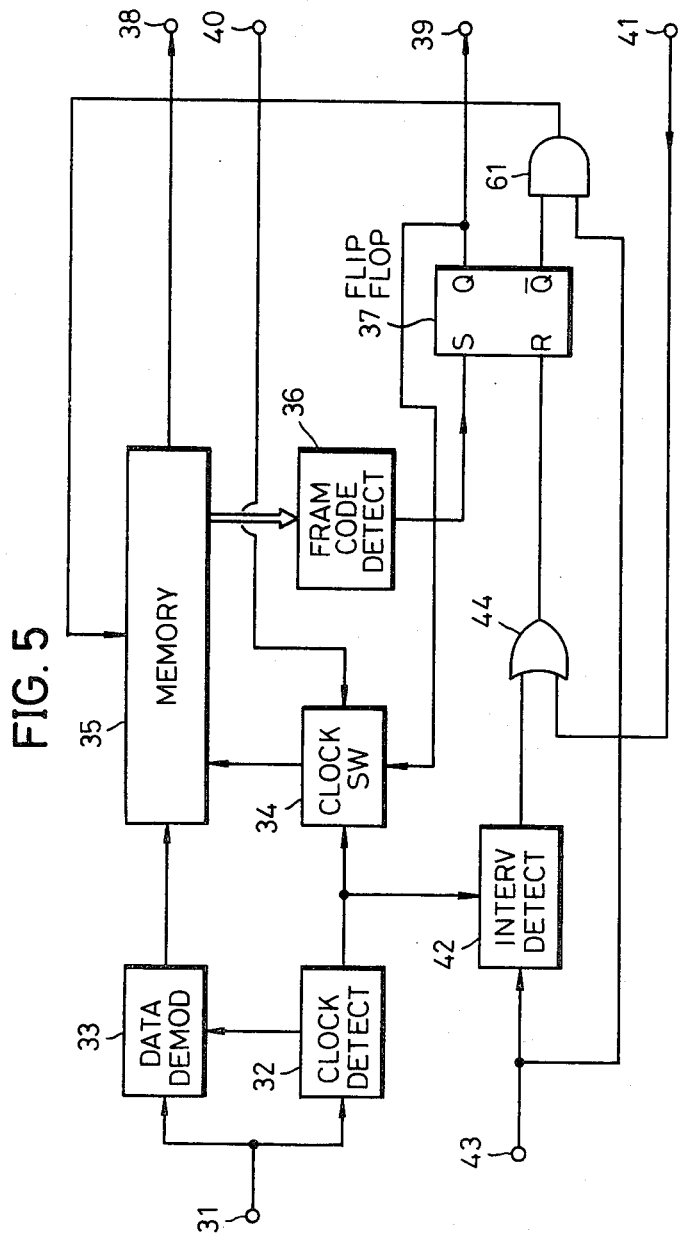
FIG. 5 is a circuit diagram showing a second embodiment of a data reproducing circuit according to the present invention.

Next, a second embodiment of a data reproducing circuit according to the present invention will be described in conjunction with FIG. 5. In FIG. 5, those parts which are the same as those corresponding parts in FIG. 2 are designated by the same reference numerals, and their description will be omitted. In the present embodiment of the invention, the output of the pulse interval detecting circuit 42 is not supplied to the memory 35 as a reset signal. The inverted output of the flip-flop 37 and the horizontal synchronizing signal from the terminal 43, are supplied to an AND-gate 61.

When there is no dropout in the reproduced signal and the data reproduction is normally performed, the detected output is not introduced at the pulse interval detecting circuit 42. When the framing code is detected by the framing code detecting circuit 36, the flip-flop 37 is set. Hence, the Q-output is obtained from the flip-flop 37, and the ready signal is supplied to the system controller 21 through the terminal 39. Therefore, as in the above described first embodiment of the invention, the normal data is read out from the memory 35. There is no $\bar{Q}$-output from the flip-flop 37.

On the other hand, when dropout exists in the reproduced signal, the framing code is not detected at the framing code detecting circuit 36, and the flip-flop 37 is not set. Thus, the flip-flop 37 is in the previously reset state, wherein there is no Q-output and there is a $\bar{Q}$-output. Because of the above dropout, the framing code is not detected as described above although scanning and reproduction is performed for one horizontal scanning period. Accordingly, in a state where the $\bar{Q}$-output is obtained from the flip-flop 37, an AND operation is performed at the AND-gate 61 when the horizontal synchronizing signal is supplied to the AND-gate 61, to produce an output. This output of the AND-gate 61 is supplied to the memory 35, to reset and clear the content in the memory 35. Accordingly, in the present embodiment of the invention, in a case where an erroneous data is obtained due to dropout and the like and the framing code cannot be detected normally, the content in the memory 35 within one horizontal scanning period is all cleared after that one horizontal scanning period in which the above dropout exists has lapsed.

Further, the present invention is not limited to these embodiments, but various variations and modifications may be made without departing from the scope of the present invention.

What is claimed is
1. A data reproducing circuit comprising:
modulated data signal supplying means for supplying a modulated data signal including a framing code representing a series of data signals;
clock signal detecting and reproducing means supplied with said demodulated data signal, for detecting and reproducing a clock signal;
data signal demodulating means supplied with said modulated data signal, for demodulating said data signal;
memory means for reading in and reading out a data signal demodulated by said data signal demodulating means;
framing code detecting means for detecting a framing code within a signal read in by said memory means;
instruction signal producing means responsive to the detection of said framing code by said framing code detecting means, for producing a signal for instructing read-out from said memory means; and
dropout detecting means for detecting dropout within said modulated data signal supplied thereto and producing a detected output, so that said instruction signal producing means does not produce said instruction signal.

2. A data reproducing circuit as claimed in claim 1 in which said dropout detecting means detects dropout within a clock signal detected and reproduced by said clock signal detecting and reproducing means.

3. A data reproducing circuit as claimed in claim 1 in which said instruction signal producing means comprises a flip-flop which is set by an output of said framing code detecting means and reset by an output of said dropout detecting means, and produces said instruction signal from a Q-output terminal.

4. A data reproducing circuit as claimed in claim 1 in which said dropout detecting means resets and clears said memory means by its detected output.

5. A data reproducing circuit as claimed in claim 1 in which said series of data signals exists within a predetermined horizontal scanning period within a vertical blanking period of a television signal, and which further comprises clearing means for resetting and clearing said memory means upon receipt of a horizontal synchronizing signal in a state where the framing code is not detected by said framing code detecting means.

6. A data reproducing circuit as claimed in claim 5 in which said instruction signal producing means comprises a flip-flop which is set by the output of said framing code detecting means and produces said instruction signal from its Q-output terminal, and said clearing means comprises an AND-gate which is supplied with a $\overline{Q}$-output from a $\overline{Q}$-output terminal of said flip-flop and the horizontal synchronizing signal, and produces an output for resetting and clearing said memory means when supplied with said horizontal synchronizing signal in a state where the $\overline{Q}$-output is supplied thereto.

7. A data reproducing circuit as claimed in claim 6 in which said flip-flop is reset by an output of said dropout detecting means.

* * * * *